INVENTOR.
Richard Stockman
BY
Wayne Lang
AGENT

United States Patent Office 3,144,903
Patented Aug. 18, 1964

3,144,903
ROTARY HEAT EXCHANGE APPARATUS WITH SUPPORT THEREFOR
Richard Stockman, Friendship Heights, N.Y., assignor to Combustion Engineering, Inc., New York, N.Y., a corporation of Delaware
Filed Apr. 26, 1962, Ser. No. 190,331
9 Claims. (Cl. 165—7)

This invention relates to rotary heat exchange apparatus and particularly to a rotary regenerative heat exchanger having a unique rotor support arrangement that eliminates many of the usual difficulties encountered with the use of heavily loaded rotor support bearings as adapted for use at slow or very slow rotational speeds.

One of the principal factors that provides a practical limitation to the development of large rotary regenerative heat exchange apparatus for use in power plants or other major installations is the availability of suitable bearing support means for the large rotary unit carried thereby. Thus while certain installations might efficiently utilize a rotary regenerative heat exchange apparatus, dependable bearing support means of the size required are not economically available and a practical limitation is thus placed upon the development and use of rotary heat exchange apparatus, especially the very large units adapted for rotation at very slow speeds.

Moreover, the rotor of a rotary regenerative heat exchanger is usually supported from a single central bearing such that its radial outer extremities are subjected to severe bending stress and structural distortion. Conversely, should the rotor be supported at its peripheral outer edge, there is a tendency for its central portion to sag under the influence of its own mass and thus alter any preferred relationship that exists between the rotor and its adjacent housing structure.

An object of this invention therefore is to provide a rotary regenerative heat exchange apparatus of novel design that removes practical size limitation from the development of a rotary air preheater and its means for rotary support.

A further object of the invention is to provide a rotor support means for a rotary regenerative heat exchange apparatus that substantially precludes distortion of the rotor.

These and other objects of my invention will become more apparent when viewed in connection with the accompanying drawing in which.

Figure 1:
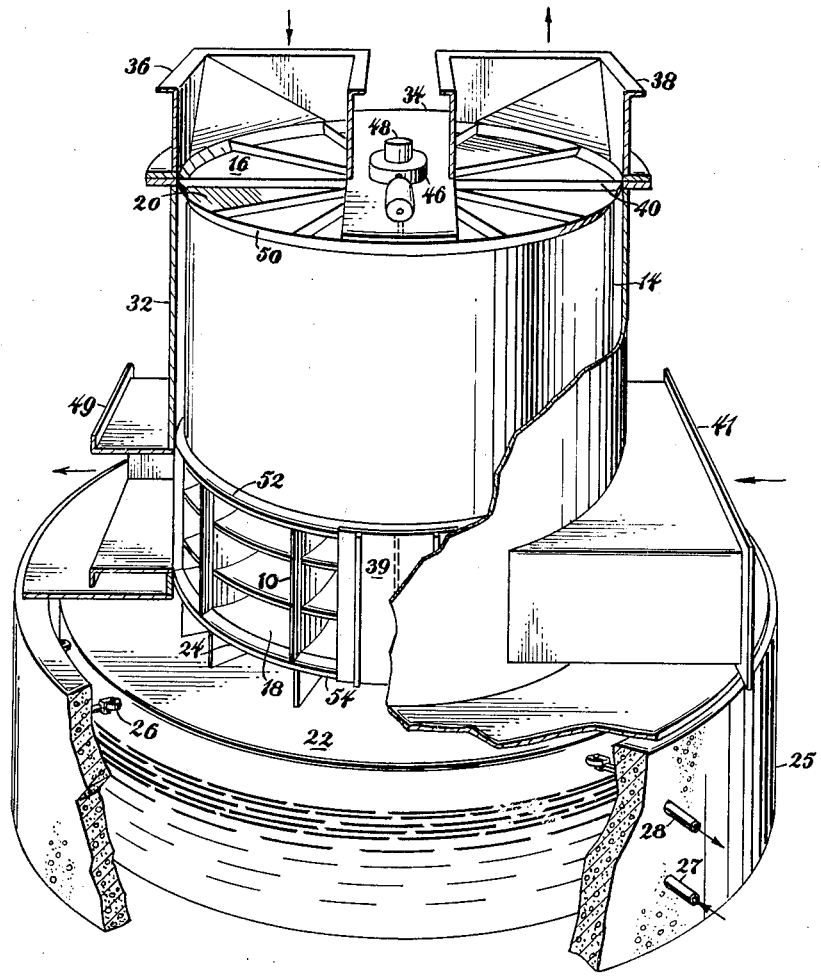
FIGURE 1 is a perspective view of the apparatus, partially broken away to show the basic construction features.
Figure 2:
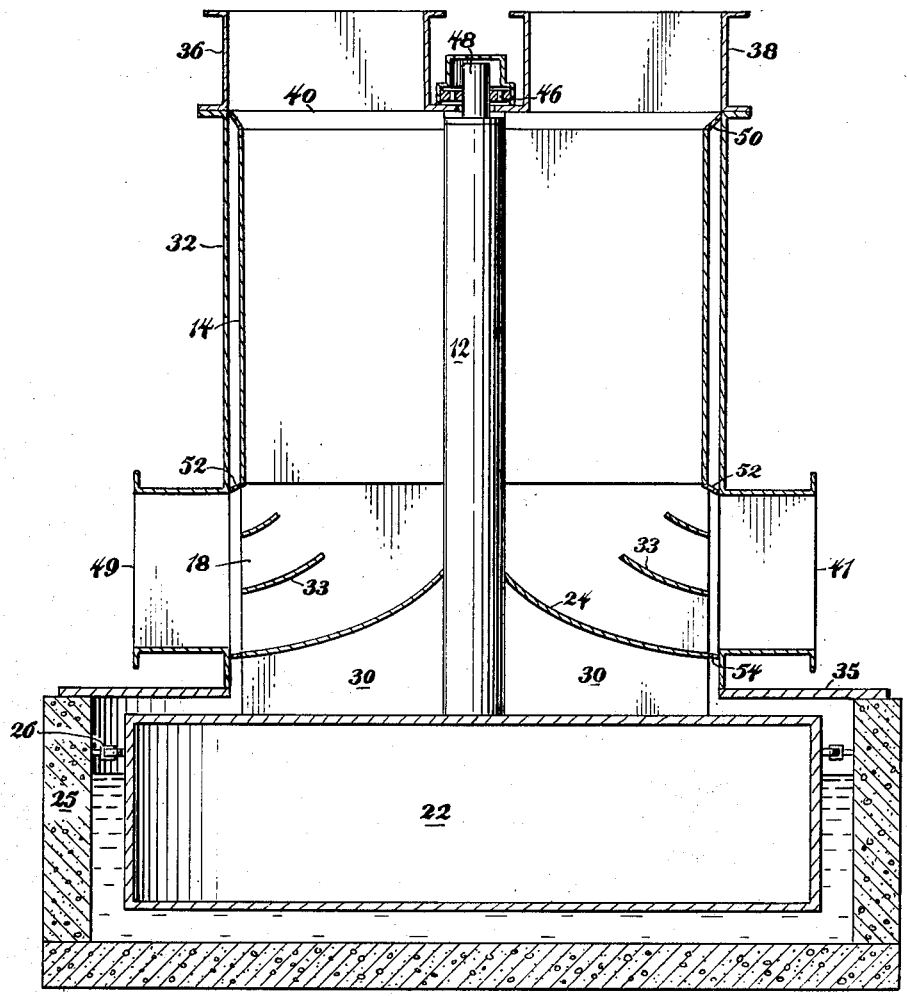
FIGURE 2 is a transverse sectional view of the apparatus showing the arrangement by which the rotor is mounted upon the flotation tank.

In the drawing a series of imperforate partitions 10 extend radially outward from a central rotor post 12 to a concentric rotor shell 14 to form a rotor having a series of sectorial compartments 16 therebetween. The rotor shell extends axially a distance less than the length of the radial partitions to provide a series of peripheral openings 18 at the lower end of each sectorial compartment. The portion of each rotor compartment radially bounded by the rotor shell is adapted to contain a mass of heat exchange material 20 through which a heating fluid and a fluid to be heated are alternately directed. The rotor is mounted axially on a cylindrical flotation tank 22 having a volume capable of displacing sufficient fluid when partially submerged therein to buoyantly support the rotor. A series of sectorial plates 24 that comprise the lower surface of each compartment are spaced from the upper surface of the tank 22 by vertical supports 30 to provide an air space therebetween that serves to insulate the top of the tank from the hot gases traversing the rotor.

The flotation tank 22 is carried in flotation chamber 25 which is formed with a diameter somewhat greater than that of tank 22 to permit its freedom of axial and rotational movement when it is buoyantly supported by a suitable displacement fluid within the chamber. Guide means 26 spaced about the inner periphery of chamber 25 maintain the tank 22 properly centered at all times regardless of its axial position within the chamber.

The flotation chamber 25 is provided with supply and exhaust ducts 27 and 28 to effectively control the depth of fluid that may be carried within the chamber. Other automatic liquid level control apparatus responsive to any of several variables may be used in conjunction with the supply and exhaust ducts 27 and 28 to provide an increased control of the fluid depth within the chamber.

A cylindrical rotor housing 32 is mounted on an annular plate 35 carried by the flotation chamber 25 in concentric alignment with the rotor and the flotation tank 22 therein. An end plate 34 divides the top of the rotor housing into two spaced apertures that lead to ducts 36 and 38 while the arcuate side walls of the rotor housing subjacent the rotor shell 14 are provided with openings that lead to ducts 41 and 49 in the housing structure.

Axial sealing means 39 carried by the arcuate rotor housing subjacent the rotor shell 14 are adapted to rub against confronting portions of the rotor and preclude fluid flow between spaced ducts 41 and 49, while at the opposite or upper end of the rotor conventional radial seals 40 and circumferential seals 50 carried by the end edges of the rotor structure bridge the space between the rotor and fixed housing structure to perform a similar function.

Flanges 52 and 54 carried by the rotor similarly cooperate with the confronting portions of the ducts 41 and 49 to prevent fluid from flowing into the annular space between the rotor shell 14 and the rotor housing 32.

A series of curved guide vanes 33 spaced apart and positioned in the lower end of each compartment 16 below the mass of heat absorbent element 20 assist fluid flowing therethrough in its transition from radial to axial or from axial to radial flow.

A guide bearing and driving means arrangement as shown at 46 is mounted on the upper end plate 34 to receive the trunnion 48 that extends axially from the central rotor post. The trunnion is formed to a length that permits continuous engagement with the guide bearing throughout periods during which the rotor assembly is being raised or lowered with respect to the surrounding rotor housing structure. Other drive means such as a conventional pin rack on the rotor or reaction jets mounted on the float tank and exhausting in the displacement fluid could readily be adapted for use without departing from the intent of this invention.

Thus the entire heat exchanger assembly including driving means, lateral support means and sealing means as designed is intended to permit freedom of axial as well as rotational movement within the rotor housing. Moreover the entire rotor assembly is buoyantly carried by a simple float tank which may readily be raised or lowered to a predetermined relationship with its surrounding housing.

While my invention has been disclosed with reference to the single figure of the drawing it will be understood that such a disclosure is intended as illustrative rather than a limiting sense and it is contemplated various modifications in the construction and arrangement of parts will readily occur to those skilled in the art.

I claim:
1. Rotary regenerative heat exchange apparatus including a rotor that comprises a cylindrical rotor shell, a cen- tral rotor post, radial partitions arranged to extend between the rotor post and rotor shell to provide a series of sectorial compartments therebetween, a perforate mass of heat absorbent material carried in each compartment of the rotor, a cylindrical housing surrounding the rotor provided with inlet and outlet openings for a heating fluid and a fluid to be heated, a guide bearing at the upper end of said housing supporting the rotor post against lateral displacement, a flotation chamber subjacent the rotor housing, a float tank in the flotation chamber connected to said rotor, and fluid material carried by said flotation chamber at a depth sufficient to float said tank and said rotor connected thereto at a predetermined position within said rotor housing.

2. Apparatus including a rotor having a cylindrical rotor shell and a central rotor post, radial partitions extending between the rotor post and rotor shell to provide a series of sectorial compartments therebetween, a cylindrical housing surrounding the rotor, inlet and outlet openings in said housing adapted to direct a heating fluid and a fluid to be heated to and from said rotor, a guide bearing at the upper end of said housing supporting said rotor against lateral displacement, a flotation chamber subjacent said rotor housing, a float tank in said flotation chamber connected integrally to said rotor, a displacement fluid carried in said chamber to a depth sufficient to float said float tank and said rotor connected thereto at a predetermined position within said housing, and means for rotating said rotor about its axis.

3. Rotary apparatus including a rotor having a cylindrical rotor shell and a central rotor post, radial partitions extending between the rotor post and rotor shell to provide a series of sectorial compartments therebetween, a mass of heat absorbent material carried by the compartments of said rotor, a housing surrounding said rotor, inlet and outlet openings in said housing adapted to direct a heating fluid and a fluid to be heated through the heat absorbent material carried by said rotor, a guide bearing at the upper end of said housing supporting said rotor post against lateral displacement, a flotation chamber subjacent said rotor housing, a float tank in said flotation chamber operatively connected to said rotor, a displacement fluid carried in said flotation chamber to provide buoyancy to said float tank, means for rotating said rotor about its axis, and means for controlling the depth of fluid in said chamber to float said rotor to an optimum relationship with its surrounding housing.

4. Rotary regenerative heat exchange apparatus including a rotor having a cylindrical rotor shell, a central rotor post concentrically positioned within said rotor shell, radial partitions extending between said rotor post and rotor shell to provide a series of sectorial compartments therebetween, a mass of heat absorbent material carried by said compartments of said rotor, a cylindrical housing enclosing said rotor, a guide bearing at the upper end of said housing supporting said rotor against lateral displacement, inlet and outlet ducts at the upper end of said housing adapted to direct a plurality of fluids through spaced parts of said rotor, inlet and outlet openings in the cylindrical portion of said rotor housing adjacent its lower end adapted to be connected with said openings at said upper end through rotor compartments therebetween, a flotation chamber subjacent the rotor housing, a float tank in the flotation chamber operatively connected to said rotor, a displacement fluid carried in said flotation chamber to provide buoyancy to said float tank, means for rotating said rotor about its axis, and means for controlling the depth of fluid within said tank.

5. Rotary regenerative heat exchange apparatus having a cylindrical float tank, a rotor including a rotor post extending axially from said float tank, a series of partitions extending radially from said rotor post, a cylindrical rotor shell concentrically surrounding the upper portion of said rotor to enclose a series of sectorial compartments that have axially disposed openings at their upper ends and radially disposed openings at their lower ends, a mass of heat exchange material carried by each compartment of said rotor, a cylindrical housing surrounding said rotor, a guide bearing at said upper end of said housing supporting said rotor against lateral displacement, spaced inlet and outlet ducts at the upper end of said housing aligned with the axially disposed openings of said rotor, spaced inlet and outlet ducts in the cylindrical housing confronting said radially disposed openings at the lower end of said compartments, a flotation chamber subjacent and adapted to receive said float tank, a displacement fluid carried by said flotation chamber, means for controlling the depth of fluid within said tank, and means for rotating said rotor about its axis to sequentially align said sectorial compartments with said spaced ducts.

6. Rotary regenerative heat exchange apparatus as defined in claim 5 wherein the means for rotating said rotor about its axis comprises means operatively connected to said float tank.

7. Rotary regenerative heat exchange apparatus as defined in claim 5 including axial sealing means on the end edges of said radial partitions that confront said cylindrical rotor housing to preclude the flow of fluid through the space therebetween.

8. Rotary regenerative heat exchange apparatus as defined in claim 5 including guide means in said flotation chamber adapted to permit axial adjustment of said float tank while precluding its lateral displacement.

9. Rotary regenerative heat exchange apparatus as defined in claim 5 having guide vanes in the sectorial compartments that confront the radially disposed openings at the lower ends of said compartments whereby fluids transversing said rotor are directed to and from their respective inlet and outlet ducts.

References Cited in the file of this patent
UNITED STATES PATENTS

| | | |
|---|---|---|
| 2,884,154 | Graham et al. | Apr. 28, 1959 |
| 3,024,005 | Dore et al. | Mar. 6, 1962 |
| 3,079,991 | Evans et al. | Mar. 5, 1963 |